(12) United States Patent
Hausladen

(10) Patent No.: US 7,661,522 B2
(45) Date of Patent: Feb. 16, 2010

(54) CONTAINER PROCESSING MACHINE, AND METHOD FOR LOADING AND UNLOADING A CONTAINER PROCESSING MACHINE

(75) Inventor: Wolfgang Hausladen, Motzing (DE)

(73) Assignee: Krones AG, Neutraubling (DE)

( * ) Notice: Subject to any disclaimer, the term of this patent is extended or adjusted under 35 U.S.C. 154(b) by 104 days.

(21) Appl. No.: 11/994,955

(22) PCT Filed: Jul. 4, 2006

(86) PCT No.: PCT/EP2006/006481

§ 371 (c)(1),
(2), (4) Date: Jun. 18, 2008

(87) PCT Pub. No.: WO2007/006452

PCT Pub. Date: Jan. 18, 2007

(65) Prior Publication Data

US 2009/0045033 A1      Feb. 19, 2009

(30) Foreign Application Priority Data

Jul. 9, 2005 (DE) .................... 10 2005 032 175

(51) Int. Cl.
*B65G 47/26* (2006.01)

(52) U.S. Cl. .................. 198/377.01; 198/441; 198/433; 134/62; 134/66; 134/69

(58) Field of Classification Search ............ 198/377.01, 198/377.03, 377.04, 377.05, 377.047, 377.08, 198/433, 436, 440, 441, 459.2; 134/62, 66, 134/67, 69

See application file for complete search history.

(56) References Cited

U.S. PATENT DOCUMENTS 3,208,579 A * 9/1965 Perrier et al. .......... 198/377.01
3,952,865 A * 4/1976 Rudszinat et al. ...... 198/377.04
4,164,997 A * 8/1979 Mueller .................... 198/427

(Continued)

FOREIGN PATENT DOCUMENTS

DE         2853215         6/1979

(Continued)

OTHER PUBLICATIONS

International Preliminary Report on Patentability for International Application No. PCT/EP2006/006481, Filing Date: Jul. 4, 2006; Date of Issuance: Jan. 29, 2008.

*Primary Examiner*—Mark A Deuble
(74) *Attorney, Agent, or Firm*—Marshall, Gerstein & Borun LLP

(57) ABSTRACT

A container processing machine (M) with at least one carousel (1, 1') which defines a multiple-row processing section (2, 2'), processing devices (24, 25) which move concurrently in multiple rows with the carousel, container holding element groups which are attached to sections of a concurrently moving conveyor device (3), holding elements (H), at least within the processing section (2, 2'), that are positioned next to each other transversely to the conveyance direction, and feed and removal systems (Z, A) for the loading and the unloading of the holding elements (H). The feed and removal systems (Z, A) are designed with a single row, while the holding elements (H) of the groups are resettable between a single-row position, in which they are oriented at least approximately parallel to the conveyance direction, and, in the area of the loading and unloading zones (L, E), a position resetting device (U) for the holding elements. In a procedure for loading and loading a container processing machine (M), the holding element groups are loaded from only one single row (D) and unloaded again into a single row (D), and the holding element groups, for the loading and unloading with respect to the conveyor device (3), are temporarily reset between single-row and multiple-row positions.

26 Claims, 1 Drawing Sheet

U.S. PATENT DOCUMENTS

| | | | | |
|---|---|---|---|---|
| 4,697,691 | A * | 10/1987 | Zodrow et al. | 198/426 |
| 4,803,055 | A * | 2/1989 | Ueda | 422/297 |
| 5,871,079 | A * | 2/1999 | Nannini et al. | 198/377.04 |
| 7,364,029 | B2 * | 4/2008 | Seidel | 198/376 |
| 2004/0245069 | A1 * | 12/2004 | Hook et al. | 198/459.1 |
| 2007/0074953 | A1 * | 4/2007 | McCabe | 198/377.08 |

FOREIGN PATENT DOCUMENTS

| | | |
|---|---|---|
| EP | 1454852 | 9/2004 |
| FR | 2795350 | 12/2000 |
| WO | WO-2007/006452 A1 | 1/2007 |

\* cited by examiner

CONTAINER PROCESSING MACHINE, AND METHOD FOR LOADING AND UNLOADING A CONTAINER PROCESSING MACHINE

CROSS-REFERENCE TO RELATED APPLICATION

The present application claims the benefit of priority of International Patent Application No. PCT/EP2006/006481, filed on Jul. 4, 2006, which application claims priority of German Patent Application No. 10 2005 032 175.5, filed Jul. 9, 2005. The entire text of the priority application is incorporated herein by reference in its entirety.

FIELD OF DISCLOSURE

The disclosure relates to a container processing machine, and to a method for loading and unloading a container processing machine, such as used with containers in beverage bottling operations.

BACKGROUND

The containers can be bottles. The container machine can be a rinser, a closing device, a filler, an inspection device, or a similar device with concurrently running processing devices, or a combination of at least two such machine construction groups.

In the container processing machine known from DE 28 53 215 A, the holder element groups, which are attached to the conveyor element, which is designed as a conveyor element chain, transport the containers in two parallel rows along the processing section, to increase the capacity in the processing section, in spite of a moderate diameter of the carousel. The holding elements are can-shaped recesses, which protrude on both sides from the upper side of the conveyor element chain in a fixed position. The feed and removal systems each comprise two feed and removal stars, which load the holding element groups from two container rows and unload in two rows. The feeding and removal of the containers in two rows requires a high construction cost and different star sizes in each star pair, as well as the control of different star speeds and container partitions.

SUMMARY OF DISCLOSURE

The disclosure is based on the problem of providing a container processing machine of the type mentioned in the introduction, and a method for loading and unloading the container processing machine, by means of which the advantages of the increased capacity and of the reduced carousel diameter can be exploited, without the disadvantage of expensive feed and removal systems.

Because, in the container processing machine according to the disclosure, the holding element groups can be reset, as far as their conveyance direction is concerned, between the single-row and multiple-row positions, and because they can be reset temporarily into the single-row position using the resetting device, at least for loading and unloading from the multiple-row position, it is possible to use simple single-row feed and removal systems, each having only one feed and removal star, or one single-row linear conveyor, while, in the case of a reduced carousel diameter, the capacity of the processing section is nevertheless increased as a function of the number of the rows. In the process, the processing sections can be designed to have two rows or a double row, or even more rows, where the concurrently moving processing devices are arranged in the processing sections in corresponding rows.

The method according to the disclosure allows, in the case of a reduced carousel diameter, an increase in the capacity in the processing section, where the containers are fed and removed in one row at an appropriate rate.

In an advantageous embodiment, it is advantageous to make use of the effect which is achieved when the conveyor element is guided along a bent section which is convex with respect to the feed and removal systems, where the support arms protrudes outward from the conveyor element. Along the bent section, the support arms are forcedly separated, or spread apart, from each other in the conveyance direction, so that at least in the area of approximately maximum forced separation sufficient free space is formed for the holding element groups, to convey them without risk of collision between adjacent groups, or to convey the containers held in these groups in the single-row position, so that they can then be loaded from a single container row and also unloaded again in a single container row. To reset the holding element groups between the positions, only the swivel brackets are swiveled relative to the support arms. These swivel motions can be forcedly controlled, for example, by a stationary guidance curve. Alternately, it is possible to subject only the swivel movement from the multiple-row position into the single-row position to forced control, and to effect the return swivel motion back into the multiple-row position automatically, for example, by means of a force storing device, or a servo drive. In an additional alternative, it would be possible to have servo drives and/or force storing devices carry out both swivel movements. Examples of usable drive elements are pneumatic spring energy storing cylinders, or also magnetic drives or similar devices.

In an advantageous embodiment, the feed and removal systems comprise single-row feed and removal stars or single-row linear conveyors, and the loading and unloading zones are provided between resettable single-row and multiple-row switching stars for the conveyor element.

In the case of a stationary position resetting device for the holding elements, said device can be arranged advantageously at a switching star, and it needs to extend substantially only through the loading and unloading zone.

In another embodiment of the container processing machine, at least two mutually feeding, multiple-row processing sections are provided, for example, one in a rinser, and the next one in a filler. However, it is also possible to add a processing section in a closing device and/or an inspection device, where the processing devices in each case move concurrently in these processing sections.

It is advantageous to provide, between mutually feeding processing sections, a multiple-row transfer section, preferably with two switching stars. Although the feeding and removal occur only in a single row, the increased capacity in the multiple rows can also be used in the transfer section.

In an additional embodiment variant, an overhead winding section for the holding element groups is provided in each case between a processing section of a rinser and the feed removal systems, to be able to clean the containers, for example, bottles, in the rinser using an overhead system, and, on the other hand, to be able to move through the feeding and the removal, as well as the other processing, steps with the containers in the normal position.

It is advantageous for the conveyor element to be an endless conveyor element chain, on which the support levers are mounted either on the chain links themselves, or on the articulations.

In an advantageous embodiment, the holding elements of the holding element group are grippers. Each gripper defines a jaw for the positive-lock reception and release of the container. In the single-row position of the grippers of a holding element group, the jaws are turned sideways from the conveyor direction to allow the loading and unloading from a single row or into a single row without problem, while, in the multiple-row position, the jaws point in or against the conveyance direction.

In an advantageous embodiment, the holding elements of the group are arranged on a common swivel bracket, which is attached in a manner which allows swiveling to the support arm in a swivel bearing. To bring the holding elements automatically into the multiple-row position, it is advantageous to define the multiple-row position by a stop of the support lever for the swivel bracket, and for the swivel bracket to be acted on by spring force in a direction towards the stop. Thus, the holding elements automatically assume the multiple-row position, as soon as they are conveyed out of the loading and unloading zone.

It is advantageous for the holding element to be conveyed in at least two mutually parallel rows, as soon as they have assumed their multiple-row position. However, it is also entirely conceivable to form more than two rows.

To allow optimal use of the spreading apart effect of the support arm of the conveyance along the bent section, the measure of the protrusion of the support arm outward, the measure of the external contours of the holding elements of the group, and the convex curvature in the bent section are adjusted to each other in such a way that, at maximum forced separation, there is no risk of collisions, and the available space is used optimally.

The radius in each processing section in the carousel is advantageously greater than the radius of the bent section. As a result, the support arms in the processing section are closer to each other than in the bent section, where the holding element groups are in the multiple-row positions, to achieve an optimally high capacity.

According to the process, adjacent holding element groups are subjected to forced separation by a guide of the conveyor element along a bent section on the external side of the bent section, and each holding element group is reset, when the forced separation is at least substantially at a maximum, into the single-row position, to conveniently allow the loading and unloading from or into, respectively, an individual row, while nevertheless preventing collisions between the containers or the holding elements.

In an advantageous process variant, the holding element groups, which are loaded in a single row and unloaded in a single row, in the processing section, form at least two parallel rows, although they can also form more than only two rows.

Finally, it is advantageous for the process if each holding element group is reset only until it reaches, and while it goes through, the loading and unloading zone from the multiple-row position into the single-row position, and then reset again into the multiple-row position. This allows the use of a simple device for resetting the holding element position, which needs to be active in only a relatively short portion of the conveyor section.

BRIEF DESCRIPTION OF THE DRAWING

The disclosure is explained with reference to FIG. 1, which shows a schematic top view of a container processing machine.

DETAILED DESCRIPTION

Figure 1:
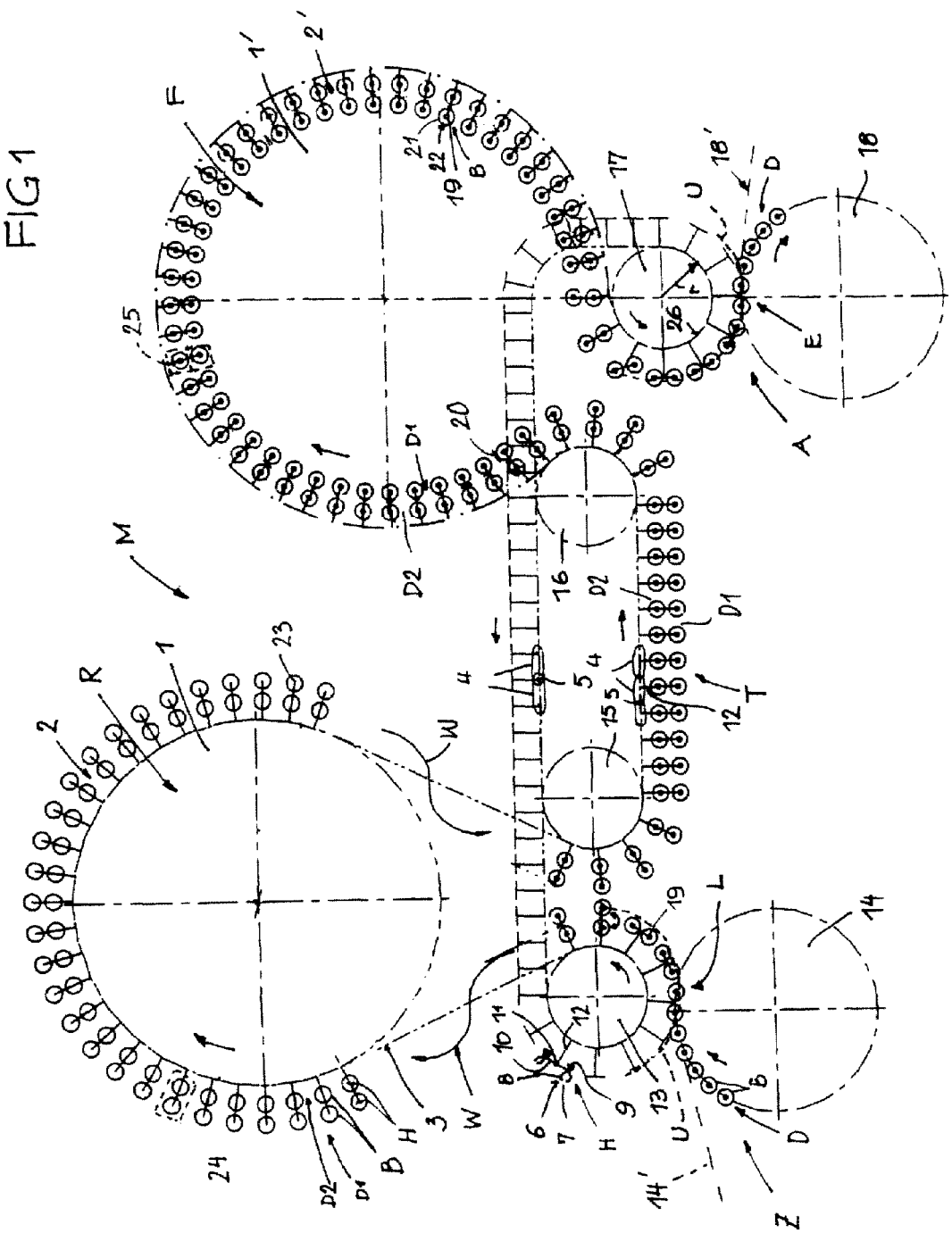

The container processing machine of the disclosure is represented in FIG. 1, for example, with two mutually feeding processing sections. However, this is only one choice from a plurality of possibilities. Thus, it is also possible to provide only a single processing section, or more than two processing sections can be connected one after the other.

A container processing machine M, which is indicated schematically in FIG. 1, is used for processing containers B, for example, bottles 22, while filling a beverage. The container processing machine M comprises a rinser R for cleaning the containers B, a filler F for filling the cleaned containers B, a feed system Z and a removal system A, as well as a transfer system T between the rinser R and the filler F.

The rinser R as well as the filler F comprise a carousel 1, 1', which can be driven in a rotating movement, and defines, in the peripheral area, in each case one processing section 2, 2', along which the containers B are conveyed in several rows D1, D2, here two mutually parallel rows, during the processing. The containers are held in the holding elements H, which are attached to an endless conveyor device 3, for example, a conveyor element chain with links 4 and articulations 5.

The holding elements H are, for example, grippers 6, each defining a jaw 7, which presents, for example, two swivelable gripper arms 8, and is acted on by a force from an energy storage device 9, for example, a spring, in the direction of closure. The gripper arms 8 grip the container B with friction lock and positive lock.

In each case two grippers 6 (corresponding to the two rows D1, D2 in the processing sections) are arranged on a common swivel bracket 10, which is attached in a way so it can be swiveled in a swivel bearing 11 on a support arm 12.

In case more than two rows D1, D2 are moved, correspondingly many grippers 6 (or other holding elements) are mounted on the swivel brackets 10.

Each support arm 12 is attached either to a chain link, for example, in the middle, or in the area of an articulation 5, in such a way that it protrudes to one side of the conveyor element 3 and substantially perpendicular with respect to the latter. The jaws 7 of the grippers 6 are oriented at least approximately perpendicularly with respect to the swivel bracket 10.

The conveyor device 3 wraps around a switching star 13 and it extends from the latter through an overhead winding section W for the holding elements H to the processing section 2 of the rinser. After the outlet of the processing section 2 of the rinser, an additional overhead winding section W follows leading to a switching star 15 of the transfer system T, in which the conveyor device 3 moves, in a straight line, towards an additional switching star 16, and from there into the processing section 2' of the filler F. At the outlet of the processing section 2' of the filler F, an additional switching star 17 is arranged, around which the conveyor element is wrapped, and from which the conveyor element 3 moves back again to the switching star 13.

The feed system Z is associated with the switching star 13 and it comprises either a feed star 14 or a linear feeder 14'. The feed star 14 (the linear conveyor 14') delivers the containers B in a single row D to the holding elements H of the conveyor device, where, in the embodiment represented, in each case two holding elements H (two grippers 6) form a holding element group on a section of the conveyor device 3.

The removal system A also comprises either a removal star 18, or a linear conveyor 18', in a single-row (single row D) design.

In the feed system Z, the containers B, for example, bottles 22 with a bottle neck 19 and a bottle body 21, are delivered so that the bottle neck 19 lies on top. In the overhead winding section W between the switching star 13 and the carousel 1 of the rinser R, the containers B are rotated with the holding elements H by 180°, so that, in the case of bottles 22, the bottle neck 19 points downward, and a bottle bottom 23 points upward. In the carousel 1 of the rinser R, processing devices 24, for example, spray nozzles, which move concurrently, are provided; they process the containers that are conveyed in the two rows D1, D2, for example, by rinsing or cleaning them.

In the second overhead winding section W, the containers B are rotated again by 1800, so that, in the case of the bottles 22 in the transfer system T, the transport again occurs with the bottle necks 19 pointing upward.

In the carousel 1' of the filler F, processing devices 25, which also move concurrently, for example, filling heads with filling valves, are provided, which fill the two rows D1, D2 of the containers B, while the latter move through the processing section 2'. From the transfer star 17, the filled bottles B are transferred to the feed system A, and removed in the latter, namely in a single row D.

The switching stars 13 and 17, respectively, have a relatively small radius r, so that a bent section, which is convex with respect to the feeding and removal systems Z, A, respectively, is formed in the conveyor element 3, at least in a loading zone L, and in an unloading zone E, between the switching star 13 and the feeding system Z, and the switching star 17 and the removal system A.

Due to the relatively small radius r of the switching stars 17, 13, the support arms 12, within the bent section 26, are moved relatively far from each other in the conveyance direction, so that there is sufficient space to reset each holding element group with the holding elements H from the multiple-row position (two rows in the embodiment represented), which each holding element group assumes at least in the processing sections 2, 2', into a single-row position, which the holding element group assumes at least in the loading zone L and the unloading zone E. This is achieved by swiveling the swivel bracket 10, for example, by 90°, in the swivel bearing place 11 on the support arm 12. For the resetting, in each case, a position resetting device for the holding elements is provided at least in the area of the loading zone L and of the unloading zone E, which device holds the holding element in front of and in the loading zone L and the unloading zone E, respectively, in the single-row position, so that the containers B, which are delivered in a single row from the feed system Z, can be introduced conveniently into the holding elements H, and removed from them, or they can be removed in the unloading zone E from the holding elements H, and removed in a single row.

The holding elements H are advantageously reset only along the switching stars 13, 17, into the single-row position, where the support arms 12 are at maximum separation from each other.

The position resetting device U for the holding elements can be, for example, a guide track, which engages on the holding elements, or following element arranged there, and which is in a fixed position, for example, at the switching star 13, 17, so that the holding elements H assume the single-row position at least in the loading zone L or the unloading zone E. The resetting device U can be designed so that, due to the forced resetting, the holding elements on each support arm are also reset again into the multiple-row or two-row position, after the passage through the loading zone L or the unloading zone E. Alternatively, it would be possible to act on the swivel bracket 10 about the swiveling bearing 11, by spring force in the direction towards the multiple-row position defined by a stop 20, so that the holding elements H, after the passage through the loading zone L or the unloading zone E, return automatically into the multiple-row position, after they were previously reset against the spring force into the single-row position. As an additional alternative (not shown), a servo drive (a spring energy storage cylinder, or a magnetic drive, or similar device) could be provided on the support arm 12 for each swivel bracket 10, which servo drive cares out, for example, the resetting from the two-row position into the single-row position against the spring force (or without the influence of the spring force), and, if no spring force is acting, it again carries out the resetting into the two-row position. Optionally, the swivel brackets 10 are locked in the multiple-row position with respect to the support arm 12, where this lock can be released temporarily during the resetting into the single-row position.

The radii in the carousel 1, 1' can be considerably greater than the radius r in the switching stars 13, 17, so that the containers B are conveyed as close as possible to each other in the processing sections 2, 2'.

The radius r, the protrusion length of the support arm 12, and the external measure of the holding elements of a group, are adjusted to each other in such a way that in the loading zone L, or the unloading zone E, and in the single-row position of the holding element group, between two adjacent containers B, an intermediate separation is formed, which prevents a collision. The separation between adjacent containers in the holding elements of a group is advantageously of the same size as the intermediate separation between two containers in adjacent groups, so that the feed star 14 and the removal star 18 can present star pockets or grippers with identical separation.

In the embodiment represented, the holding elements in the two rows D1, D2 are oriented substantially radially with respect to the rotation axis of the given carousel 1, 1'. Alternatively, an orientation that is not radial is also conceivable. Furthermore, it is possible to control the resetting from the multiple-row position into the single-row position exactly in such a way that each holding element, when approaching a container that is delivered by the feed system Z, or the switching star 17 when approaching a holder for a container, which is provided in the removal system A, is moved forcefully outward, to carry out the reception or transfer without additional aids.

Furthermore, in the embodiment represented, grippers 6 are indicated, which open and automatically close by pushing the container in, or pulling it out, where the jaw 7 in the loading zone L or the unloading zone E points outward in each case. However, it would also be possible alternatively to provide controlled grippers, or other controlled holding elements H.

On the conveyor path from the switching star 17 through the transfer section T back to the switching star 13, the conveyor device 3 with the holding elements H is advantageously lifted or lowered, to prevent collision with the containers B, which are conveyed out of the processing section 2 towards the transfer star 15, and from the transfer star 16 alternatively towards the processing section 2', as well as from the processing section 2' towards the switching star 17.

The invention claimed is:

1. Container processing machine (M), comprising one of a filler (F) and rinser (R) for bottles (22), at least one carousel (1, 1') which defines a multiple-row processing section (2, 2'), processing devices (24, 25) which move in multiple rows with the at least one carousel, container holding element groups attached to sections of a concurrently moving conveyor device (3), with the holding elements (H), at least within the processing section (2, 2'), positioned next to each other transversely to the conveyance direction, and feed and removal systems (Z, A) which, for the loading and the unloading of the holding elements (H) in the loading and unloading zones (L, E), feed into, and remove from, the processing section (2, 2'), with the feed and removal systems (Z, A), for the multiple-row processing section (2, 2'), having a single row (D), with each holding element group being resettable between a single-row position, in which the holding elements (H) are at least approximately parallel to the conveyance direction, and the multiple-row position which lies transversely to the conveyance direction, and, in the area of the loading and unloading zones (L, E), a position resetting device (U) for the holding elements.

2. Container processing machine according to claim 1, wherein in the conveyor device (3), in the loading and unloading zones (L, E), forms a bent section (26) which is convex with respect to the feeding and removal systems (Z, A), and the holding elements (H) of the group are arranged on a section of the conveyor device (3) on a support arm (12) which protrudes, at least in the loading and unloading zone (L, E), from the conveyor device section to the external section of the convex bent section (26), and the holding elements (H) of the group on the support arm (12) are attached so they can be swiveled between the single-row position and the multiple-row position.

3. Container processing machine according to claim 2, wherein the conveyor device (3) is an endless conveyor element chain, and the support arms (12) are mounted on one of chain links (4) or on articulations (5), in each case between two chain links (4).

4. Container processing machine according to claim 2, wherein the radius of the processing section (2, 2') in the carousel (1, 1') is greater than the radius (r) of the bent section (26).

5. Container processing machine according to claim 2, wherein the holding elements (H) of a group are arranged on a common swivel bracket (10), the common swivel bracket (10) being attached in a way so as to swivel on the support arm (12).

6. Container processing machine to claim to 5, wherein the swivel bracket (10) is acted on by a spring force in the direction towards the multiple-row position, and defined by a stop (20) on the support arm (12).

7. Container processing machine according to claim 2, wherein the measure of the protrusion of the support arm (12) from the conveyor device (3) outward, the measure between the external contours of the holding elements (H) of the group, and the convex curvature in the bent section (26), are adjusted to each other in such a way that in the bent section (26), in each case adjacent, containers (B) in two adjacent holding elements (H) of two adjacent support arms (12) in the single-row position form an intermediate separations.

8. Container processing machine according to claim 7, wherein the measure of the protrusion comprises the measure of the swivel bearing (10) of the swivel bracket (1) from the conveyor device (3).

9. Container processing machine according to claim 7, wherein the measure between the external contours comprises the measure between the external contours of the containers (13) which are loaded in the holding elements (H).

10. Container processing machine according to claim 7, wherein the convex curvature comprises a curvature radius (r).

11. Container processing machine according to claim 7, wherein the intermediate separation is identical to the separation in the holding element (H).

12. Container processing machine according to claim 2, wherein the position resetting device (U) for the holding elements comprises a stationary force guidance in the conveyance direction, behind the loading and in front of the unloading zone (L, E), and one of an energy storage device which moves concurrently, or a servo drive for resetting the holding elements (H) from the single-row position into the multiple-row position.

13. Container processing machine according to claim 1, wherein the feeding and removal systems (Z, A) present one of single-row feeding and removal stars (14, 18) or single-row linear conveyors (14', 18'), and the loading and unloading zones (L, E) are provided at switching stars (13, 17) for the conveyor device (3), which switching stars can be reset between a single-row and multiple-row position.

14. Container processing machine according to claim 13, wherein the position resetting device (U) for the holding elements is arranged in each case at a switching star (13, 17).

15. Container processing machine according to claim 1, wherein the machine (M) presents at least two mutually feeding, multiple-row, processing sections (2, 2').

16. Container processing machine according to claim 15, and a multiple-row transfer section (T) between the processing sections (2, 2').

17. Container processing machine according to claim 16, wherein the multiple-row transfer section (T) has two additional switching stars (15, 16).

18. Container processing machine according to claim 15, wherein the at least two mutually feeding, multiple-row, processing section (2, 2') comprise a rinser (R), and a filler (F) which is connected after the rinser (R).

19. Container processing machine according to claim 1, wherein, in the conveyance direction, in front of and behind a processing section (2), in each case one overhead winding section (W) positioned for the holding elements (H) which are arranged in the multiple-row position.

20. Container processing machine according to claim 19, wherein the processing station (2) is a rinser (R).

21. Container processing machine according to claim 1, wherein the holding elements (H) are grippers (6), and each gripper (6) presents a jaw (7), which points, in the single-row position, from the conveyor element (3) outward, and in the multiple-row position, one of in or against the conveyance direction.

22. Container processing machine according to claim 1, wherein the several rows comprise at least two mutually substantially parallel rows (D1, D2).

23. Method for loading and unloading a container processing machine (M) which comprises at least one carousel (1, 1'), which defines a multiple-row processing section (2, 2') with concurrently running processing devices (24, 25), and at least feed and delivery systems (Z, A) for containers (B), particularly bottles (22), where container holding element groups, which are attached to a conveyor device (3), load in a loading zone (L) with containers, and unload in an unloading zone (E), and the containers (B) move through the processing section (2, 2') in several mutually parallel rows, comprising loading the holding element groups from only a single row (D) of the feed system (Z), and unloading the holding element groups into a single row (D) of the removal system (A), and, for loading and unloading with respect to the conveyor device (3), temporarily resetting the holding element groups between single-row and multiple-row positions.

24. Method according to claim 23, and in the conveyance direction, subjecting adjacent holding element groups to a forced separation, temporarily in the conveyance direction, by a guide of the conveyor device (3) along a bent section (26) on the exterior side of the bent section, and resetting each holding element group into the single-row position, with a forced separation between the holding element groups, which forced separation is at least substantially at a maximum.

25. Method according to claim 23, and with the single-row loaded and single-row unloaded holding element groups, at least during their conveyance along the processing section (2, 2'), forming at least two parallel rows (D1, D2).

26. Method according to claim 23, and resetting each holding element group, before reaching and passing through the loading and unloading zone (L, E), from the multiple-row position into the single-row position, and resetting each holding element group, before reaching the processing section (2, 2'), into the multiple-row position.

* * * * *